US012659770B2

(12) United States Patent
Venkataraman et al.

(10) Patent No.: US 12,659,770 B2
(45) Date of Patent: Jun. 16, 2026

(54) METHODS TO ENHANCE SECONDARY COMPONENT CARRIER (SCC) AND DUAL CONNECTIVITY (DC) PERFORMANCE IN LTE AND NEW RADIO (NR) CELLULAR NETWORKS

(71) Applicant: Apple Inc., Cupertino, CA (US)

(72) Inventors: Vijay Venkataraman, San Jose, CA (US); Li Su, San Jose, CA (US); Muthukumaran Dhanapal, Sunnyvale, CA (US)

(73) Assignee: APPLE INC., Cupertino, CA (US)

( * ) Notice: Subject to any disclaimer, the term of this patent is extended or adjusted under 35 U.S.C. 154(b) by 861 days.

(21) Appl. No.: 17/887,845

(22) Filed: Aug. 15, 2022

(65) Prior Publication Data

US 2023/0068265 A1     Mar. 2, 2023

Related U.S. Application Data

(60) Provisional application No. 63/239,186, filed on Aug. 31, 2021.

(51) Int. Cl.
| | |
|---|---|
| *H04W 24/08* | (2009.01) |
| *H04W 24/10* | (2009.01) |
| *H04W 76/27* | (2018.01) |
| *H04W 76/28* | (2018.01) |

(52) U.S. Cl.
CPC ........... *H04W 24/08* (2013.01); *H04W 24/10* (2013.01); *H04W 76/27* (2018.02); *H04W 76/28* (2018.02)

(58) Field of Classification Search
CPC . H04W 28/0268; H04W 28/02; H04W 24/02; H04W 72/231; H04W 72/51; H04W 76/28; H04W 52/0274; H04W 68/02
See application file for complete search history.

(56) References Cited

U.S. PATENT DOCUMENTS

| | | | |
|---|---|---|---|
| 2017/0245213 A1* | 8/2017 | Martinez Tarradell | ...................... H04L 5/0048 |
| 2021/0135926 A1* | 5/2021 | Siomina | .................. H04L 43/16 |
| 2022/0109488 A1* | 4/2022 | Nam | ...................... H04W 74/04 |
| 2022/0225377 A1* | 7/2022 | Kim | .................. H04W 52/0216 |

* cited by examiner

*Primary Examiner* — Iqbal Zaidi
(74) *Attorney, Agent, or Firm* — Sterne, Kessler, Goldstein & Fox P.L.L.C.

(57) ABSTRACT

Aspects are described for a user equipment (UE) comprising a transceiver configured to enable wireless communication with a base station, and a processor communicatively coupled to the transceiver. The processor is configured to enter a radio resource control (RRC) idle mode. The processor is further configured to measure at least one cell of a set of cells in a sleep period, wherein the sleep period is indicated in a discontinuous reception (DRX) configuration message received from the base station. The processor is further configured to receive a UE information request from the base station responsive to entering an RRC connected mode and transmit results of the measurement to the base station responsive to the UE information request to enable faster carrier addition by a network the UE connects to.

19 Claims, 7 Drawing Sheets

300

Base Station

UE

302 Transmit system information

304 Transmit RRC release message

306 Idle mode measurement

308 RRC connection establish

310 UE Information request

312 UE Information response

314 RRC connection reconfiguration

700

METHODS TO ENHANCE SECONDARY COMPONENT CARRIER (SCC) AND DUAL CONNECTIVITY (DC) PERFORMANCE IN LTE AND NEW RADIO (NR) CELLULAR NETWORKS

CROSS-REFERENCE TO RELATED APPLICATIONS

The present application claims the benefit of U.S. Provisional Patent Application No. 63/239,186, filed on Aug. 31, 2021, which is incorporated by reference herein in its entirety.

BACKGROUND

Field

The described aspects generally relate to cell measurements and reporting.

SUMMARY

Some aspects of this disclosure relate to systems, apparatuses, and methods for implementing cell measurements in a radio resource control (RRC) idle mode and cell measurement reporting. For example, the systems, the apparatuses, and the methods are provided for implementing enhance cell measurements to improve efficiency and quality of cell measurements.

Some aspects of this disclosure relate to a user equipment (UE) comprising a transceiver configured to enable wireless communication with a base station, and a processor communicatively coupled to the transceiver. The processor is configured to enter a radio resource control (RRC) idle mode. The processor is further configured to measure at least one cell of a set of cells in a sleep period, wherein the sleep period is indicated in a discontinuous reception (DRX) configuration message received from the base station. The processor is further configured to receive a UE information request from the base station and transmit results of the measurement to the base station responsive to the UE information request.

Some aspects of this disclosure relate to a method of operating a user equipment (UE). The method comprises entering a radio resource control (RRC) idle mode and measuring at least one cell of a set of cells in a sleep period. The sleep period is indicated in a discontinuous reception (DRX) configuration message received from the base station. The method further comprises receiving a UE information request from the base station and transmitting results of the measurement to the base station.

Some aspects of this disclosure relate to a non-transitory computer-readable medium (CRM) comprising instructions to, upon execution of the instructions by one or more processors of a user equipment (UE), cause the UE to perform operations. The operations comprise entering a radio resource control (RRC) idle mode and measuring at least one cell of a set of cells in a sleep period. The sleep period is indicated in a discontinuous reception (DRX) configuration message received from the base station. The operations further comprise receiving a UE information request from the base station and transmitting results of the measurement to the base station.

This Summary is provided merely for the purposes of illustrating some aspects to provide an understanding of the subject matter described herein. Accordingly, the above-described features are merely examples and should not be construed to narrow the scope or spirit of the subject matter in this disclosure. Other features, aspects, and advantages of this disclosure will become apparent from the following Detailed Description, Figures, and Claims.

BRIEF DESCRIPTION OF THE FIGURES

The accompanying drawings, which are incorporated herein and form part of the specification, illustrate the present disclosure and, together with the description, further serve to explain the principles of the disclosure and enable a person of skill in the relevant art(s) to make and use the disclosure.

Figure 1:
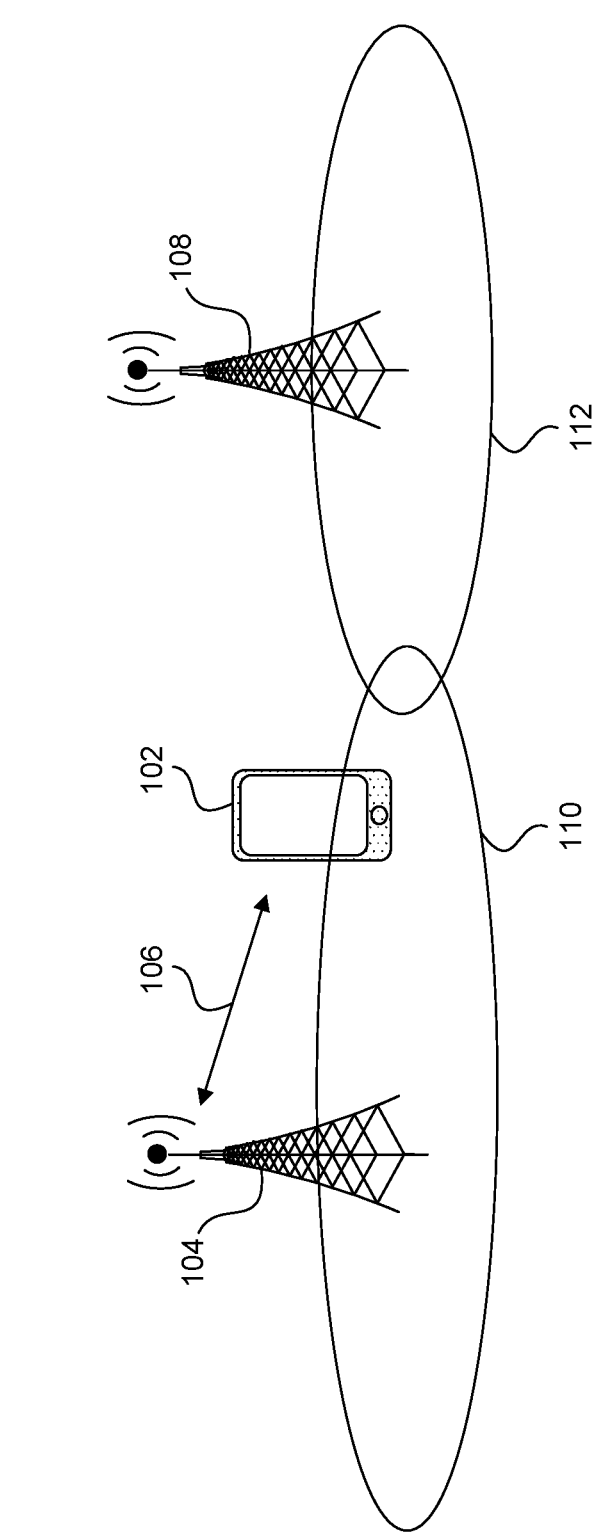
FIG. 1 illustrates an example system implementing cell measurements in a radio resource control (RRC) idle mode and cell measurement reporting, according to some aspects of the disclosure.

The present disclosure is described with reference to the accompanying drawings. In the drawings, generally, like reference numbers indicate identical or functionally similar elements. Additionally, generally, the left-most digit(s) of a reference number identifies the drawing in which the reference number first appears.

DETAILED DESCRIPTION

Some aspects of this disclosure include apparatuses and methods for implementing cell measurements in a radio resource control (RRC) idle mode and cell measurement reporting. For example, the systems, the apparatuses, and the methods are provided for implementing enhanced cell measurements to improve the efficiency and quality of cell measurements.

In some aspects, a user equipment (UE) can enter the RRC idle mode to reduce power consumption. In the RRC idle mode, the UE performs fewer radio transmissions to and from a base station compared with an RRC connected mode. For example, the UE can receive an RRC release message from the base station and enters the RRC idle mode. Subsequently, the UE periodically enters a power saving status in sleep periods where the UE refrains from transmitting and receiving radio signals to save power. Furthermore, the UE can also wake up periodically to monitor radio signals transmitted by the base station.

In some aspects, the base station can transmit a paging message to the UE and the UE can detect and verify the paging message in a wake-up period. The paging message can indicate a communication session, such as a phone call, initiated from the network and handled by the base station. The UE subsequently establishes an RRC connection with the base station and returns to the RRC connected mode. The UE can also initiate the RRC connection establishment. For example, a user may activate the UE by turning on a screen of the UE or launching an application in the UE. The UE can transmit an RRC connection request to the base station and establish the RRC connection with the base station. In both cases, after returning to the RRC connected mode, the UE can configure or reconfigure connections with secondary cells corresponding to secondary component carriers (SCCs). For example, the UE may be configured to perform a dual connection (DC) where the UE connects to both long-term evolution (LTE) cells and new radio (NR) cells. Because channel conditions and signal strengths correspond to the secondary cells may have changed, the UE is required to measure the secondary cells after returning to the RRC connected mode. For example, the UE can measure received signal strengths of the secondary cells and adjust connections to the secondary cells accordingly. However, the measurements of secondary cells take time and can cause a delay to subsequent communications of the UE after returning to the RRC connected mode.

In some aspects, the UE can perform the measurements while in the RRC idle mode and report results of the measurement to the base station after returning to the RRC connected mode. In such a case, the UE can configure or reconfigure the secondary cells without waiting for the measurements. For example, the UE can measure the secondary cells during wake-up periods in the RRC idle mode and store the results in memory of the UE. The UE can also update the results if a secondary cell is measured more than one time.

In some aspects, the UE may return to the RRC connected mode within a short period after entering the RRC idle mode. In such a case, the UE may not be able to measure all the secondary cells and may report incomplete results to the base station. The UE then needs to measure at least secondary cells that are not included in the incomplete results and a delay is expected. To avoid such a delay, the UE can perform enhanced measurements in a period of time after entering the RRC idle mode. For example, the UE can perform measurements of the secondary cells both in wake-up periods and sleep periods during first 60 seconds after entering the RRC idle mode. The period of time of the enhanced measurements can be configured based on user's behaviors, history data, or predetermined. For example, the UE can determine based on the user's past behaviors that the user normally activates the UE within the period of time after entering the RRC idle mode. The UE can also determine based on the history data that the UE normally receives a paging message from the base station within the period of time after entering the RRC idle mode.

In some aspects, the UE can stay in the RRC idle mode for an extended period. The longer the UE stays in the RRC idle mode, the more energy is required to measure the secondary cells. To avoid such a situation, the UE can be configured to pause the measurements in wake-up periods after staying in the RRC idle mode for an amount of time. For example, the UE can start a T331 timer when entering the RRC idle mode. When the T331 timer expires, the UE pauses measurements in subsequent wake-up periods. When the UE expects to return to the RRC connected mode, the UE performs a complete measurement for all the secondary cells. For example, when receiving a paging message from the base station, the UE can perform the complete measurement.

In some aspects, the UE can prioritize the secondary cells differently. For example, certain cells are previous serving cells of the UE and it is more likely that these cells would serve the UE when returning to the RRC connected mode. The UE can measure these cells more often and/or exclusively when other cells are not measured. In such a way, the UE saves energy and improves the efficiency of the measurements.

In some aspects, the UE can filter the measurements based on their ages. For example, the UE can check when certain measurements were performed prior to reporting to the base station. If certain measurements were performed before a threshold time point, the UE can remove these measurements from the reporting.

FIG. 1 illustrates an example system 100 implementing cell measurements in an RRC idle mode and cell measurement reporting, according to some aspects of the disclosure. The example system 100 is provided for the purpose of illustration only and does not limit the disclosed aspects. The example system 100 may include, but is not limited to, a UE 102, a base station 104, and a base station 108. The UE 102 may be implemented as an electronic device configured to operate based on a wide variety of wireless communication techniques. These techniques may include, but are not limited to, techniques based on 3rd Generation Partnership Project (3GPP) standards. For example, the UE 102 can be configured to operate using one or more 3GPP releases, such as Release 15 (Rel-15), Release 16 (Rel-16), Release 17 (Rel-17), or other 3GPP releases. The UE 102 may include, but is not limited to, wireless communication devices, smartphones, laptops, desktops, tablets, personal assistants, monitors, televisions, wearable devices, Internet of Things (IoT) devices, vehicle communication devices, and the like. The base stations 104 and 108 may include one or more nodes configured to operate based on a wide variety of wireless communication techniques such as, but not limited to, techniques based on the 3GPP standards. For example, the base stations 104 and 108 may include nodes configured to operate using Rel-15, Rel-16, Rel-17, or other 3GPP releases. The base stations 104 and 108 may include, but not limited to, NodeBs, eNodeBs, gNBs, new radio base stations (NR BSs), access points (APs), remote radio heads, relay stations, and others.

In some aspects, the UE 102 connects with the base station 104 via a communication link 106. In an RRC connected mode, the UE 102 transmits to and receives from the base station 104 via the communication link 106. The base station 104 may support a cell 110. The cell 110 can be a primary cell serving the UE 102. In some aspects, the base station 104 may also support a set of secondary cells, which includes cells serving the UE 102 and/or cells that can potentially serve the UE 102. The secondary cells and the primary cell can correspond to a same radio access technology (RAT). For example, the set of secondary cells and the primary cell can all be LTE cells or NR cells. In some aspects, the set of secondary cells and the primary cell can correspond to different RATs and the UE 102 can be in a DC mode. For example, the primary cell can be an LTE cell and one or more cells of the set of secondary cells can be NR cells. For another example, the primary cell can be an NR cell and one or more cells of the set of secondary cells can be LTE cells.

In some aspects, the base station 104 can transmit an RRC release message to the UE 102. The UE 102 then enters an RRC idle mode based on the RRC release message. In the RRC idle mode, the UE 102 enters a power saving mode and wakes up periodically. For example, the UE 102 can wake up every 1.28 seconds for a short wake-up period. In the power saving mode, the UE 102 can be inactive and refrains from transmitting or receiving radio signals. In the wake-up period, the UE 102 monitors radio signals from the base station. For example, the UE 102 check whether the base station 104 transmits a paging message. The UE 102 further verifies the paging message if the UE 102 receives it and returns to the RRC connected mode based on the paging message. In addition, the UE 102 can receive system information from the base station 104 in the wake-up period. For example, the system information includes, but not limited to, a master information block (MIB) and one or more system information blocks (SIBs).

In some aspects, conditions of the set of secondary cells can change while the UE 102 is in the RRC idle mode. For example, signal strengths of one or more secondary cells of the set of secondary cells may become too weak to serve the UE 102. In some aspects, the UE 102 measures the conditions of the set of secondary cells after returning to the RRC connected mode and reports the conditions to the base station 104. The base station 104 may configure or reconfigure the set of secondary cells. For example, the base station 104 can select one or more secondary cells from the set of secondary cells to serve the UE 102 based on the conditions. The base station 104 can also reconfigure settings of one or more secondary cells serving the UE 102 based on the conditions. However, as described above, the measurement of the set of the secondary cells can cause a delay in communications between the UE 102 and the base station 104 after the UE 102 returns to the RRC connected mode.

In some aspects, the UE 102 can measure the set of the secondary cells while in the RRC idle mode. For example, the UE 102 can measure the set of the secondary cells in wake-up periods. However, because the wake-up periods are short, the UE 102 may not be able to measure the set of the secondary cells completely in one wake-up period. For example, the set of the secondary cells may include eight cells and the UE 102 can measure two cells in one wake-up period. Therefore, the UE 102 can complete one round of measurements in four wake-up periods.

In some aspects, the base station 108 supports a cell 112. The UE 102 can move closer to the base station 108 while in the RRC idle mode. Therefore, the UE 102 can also measure a condition of the cell 112 while in the RRC idle mode and/or after returning to the RRC connected mode. The base station 104 can configure the cell 112 directly or via the base station 108 to serve the UE 102.

In some aspects, the base station 104 may determine that a secondary cell has a stronger received signal strength than the primary cell. For example, the base station 104 may determine that the received signal strength of the cell 112 is stronger than that of the cell 110. In such a case, the base station 104 can initiate a handover process of the UE 102 to move the UE 102 from the cell 110 to the cell 112.

Figure 2:
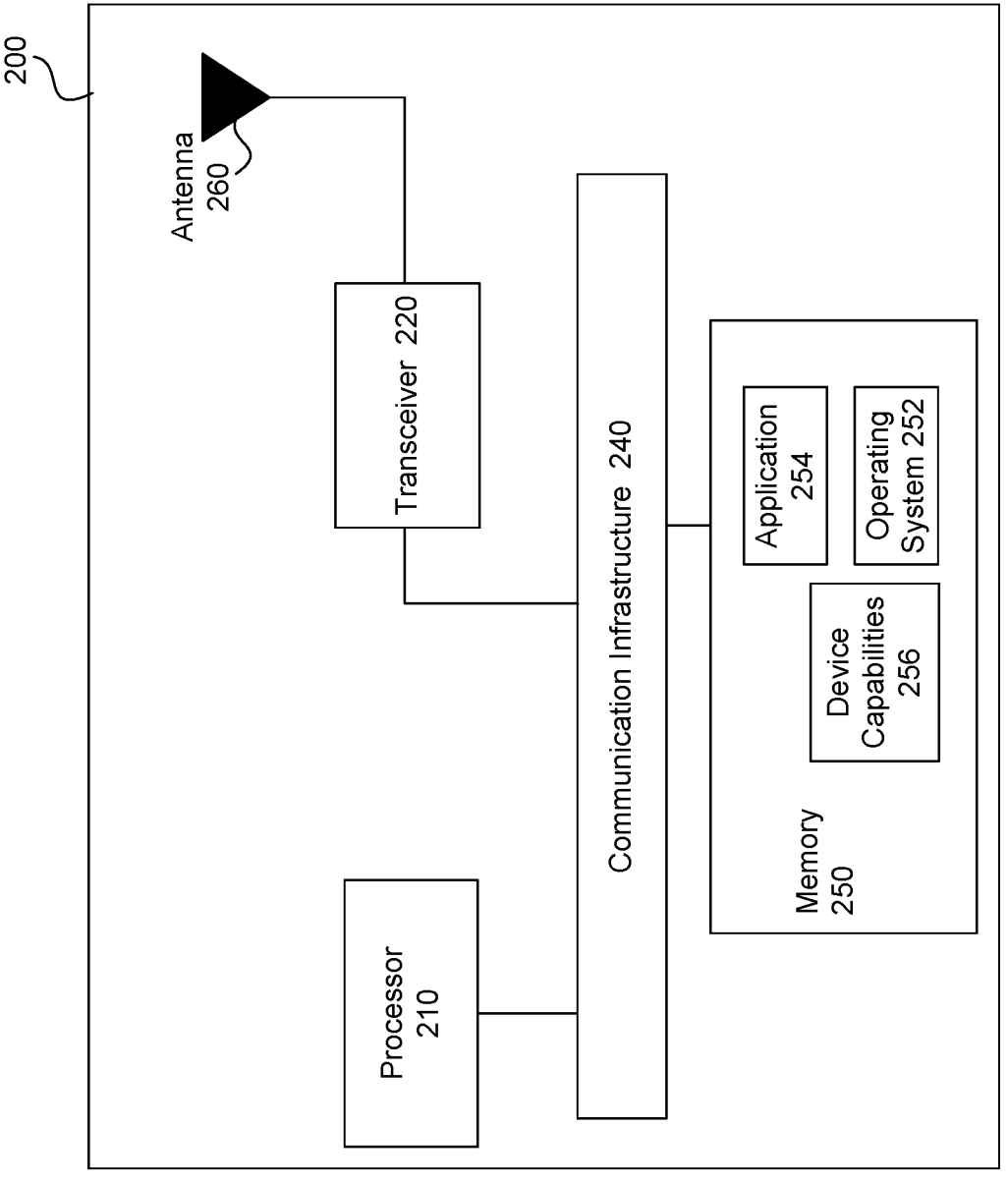
FIG. 2 illustrates a block diagram of an example system of an electronic device for the cell measurements and reporting, according to some aspects of the disclosure.

FIG. 2 illustrates a block diagram of an electronic device 200 implementing the cell measurements and reporting, according to some aspects of the disclosure. The electronic device 200 may be any of the electronic devices (e.g., the UE 102, and the base stations 104 and 108) of the system 100. The electronic device 200 includes a processor 210, one or more transceivers 220, a communication infrastructure 240, a memory 250, an operating system 252, an application 254, device capabilities 256, and antennas 260. Illustrated systems are provided as exemplary parts of electronic device 200, and electronic device 200 may include other circuit(s) and subsystem(s). Also, although the systems of electronic device 200 are illustrated as separate components, the aspects of this disclosure may include any combination of these, e.g., less, or more components.

The memory 250 may include random access memory (RAM) and/or cache, and may include control logic (e.g., computer software) and/or data. The memory 250 may include other storage devices or memory. According to some examples, the operating system 252 may be stored in the memory 250. The operating system 252 may manage transfer of data from the memory 250 and/or the one or more applications 254 to the processor 210 and/or the one or more transceivers 220. In some examples, the operating system 252 maintains one or more network protocol stacks (e.g., Internet protocol stack, cellular protocol stack, and the like) that may include a number of logical layers. At corresponding layers of the protocol stack, the operating system 252 includes control mechanisms and data structures to perform the functions associated with that layer.

According to some examples, the application 254 may be stored in the memory 250. The application 254 may include applications (e.g., user applications) used by the electronic device 200 and/or a user of the electronic device 200. The applications in the application 254 may include applications such as, but not limited to, radio streaming, video streaming, remote control, and/or other user applications. In some aspects, the device capabilities 256 may be stored in the memory 250.

The electronic device 200 may also include the communication infrastructure 240. The communication infrastructure 240 provides communication between, for example, the processor 210, the one or more transceivers 220, and the memory 250. In some implementations, the communication infrastructure 240 may be a bus.

The processor 210, alone, or together with instructions stored in the memory 250 performs operations enabling electronic device 200 of the system 100 to implement mechanisms for cell measurements and reporting, as described herein. Alternatively, or additionally, the processor 210 can be "hard coded" to implement mechanisms for cell measurements and reporting, as described herein.

The one or more transceivers 220 transmit and receive communications signals support mechanisms for cell measurements and reporting. Additionally, the one or more transceivers 220 transmit and receive communications signals that support mechanisms for measuring communication link(s), generating and transmitting system information, and receiving the system information. According to some aspects, the one or more transceivers 220 may be coupled to the antennas 260 to wirelessly transmit and receive the communication signals. The antennas 260 may include one or more antennas that may be the same or different types and can form one or more antenna ports. The one or more transceivers 220 allow electronic device 200 to communicate with other devices that may be wired and/or wireless. In some examples, the one or more transceivers 220 may include processors, controllers, radios, sockets, plugs, buffers, and like circuits/devices used for connecting to and communication on networks. According to some examples, the one or more transceivers 220 include one or more circuits to connect to and communicate on wired and/or wireless networks.

According to some aspects of this disclosure, the one or more transceivers 220 may include a cellular subsystem, a WLAN subsystem, and/or a Bluetooth™ subsystem, each including its own radio transceiver and protocol(s) as will be understood by those skilled in the arts based on the discussion provided herein. In some implementations, the one or more transceivers 220 may include more or fewer systems for communicating with other devices.

In some examples, the one or more the transceivers 220 may include one or more circuits (including a WLAN transceiver) to enable connection(s) and communication over WLAN networks such as, but not limited to, networks based on standards described in IEEE 802.11.

Additionally, or alternatively, the one or more the transceivers 220 may include one or more circuits (including a Bluetooth™ transceiver) to enable connection(s) and communication based on, for example, Bluetooth™ protocol, the Bluetooth™ Low Energy protocol, or the Bluetooth™ Low Energy Long Range protocol. For example, the transceiver 220 may include a Bluetooth™ transceiver.

Additionally, the one or more the transceivers 220 may include one or more circuits (including a cellular transceiver) for connecting to and communicating on cellular networks. The cellular networks may include, but are not limited to, 3G/4G/5G networks such as Universal Mobile Telecommunications System (UMTS), Long-Term Evolution (LTE), and the like. For example, the one or more transceivers 220 may be configured to operate according to one or more of Rel-15, Rel-16, Rel-17, or other releases of 3GPP standard.

As discussed in more detail below with respect to FIGS. 3-7, processor 210 may implement different mechanisms for the cell measurements and reporting as discussed with respect to the system 100 of FIG. 1.

Figure 3:
FIG. 3 illustrates an example method of the cell measurements and reporting, according to aspects of the disclosure.

FIG. 3 illustrates an example method 300 of the cell measurements and reporting. The example method 300 is provided for the purpose of illustration only and does not limit the disclosed aspects. As a convenience and not a limitation, FIG. 3 may be described with regard to elements of FIGS. 1, 2, and 7. The example method 300 may represent the operation of electronic devices (for example, the UE 102, and the base stations 104 and 108 of FIG. 1) implementing the cell measurements and reporting. The example method 300 may also be performed by the electronic device 200 of FIG. 2, controlled or implemented by processor 210, and/or computer system 700 of FIG. 7. But the example method 300 is not limited to the specific aspects depicted in those figures and other systems may be used to perform the method, as will be understood by those skilled in the art. It is to be appreciated that not all operations may be needed, and the operations may not be performed in the same order as shown in FIG. 3.

At 302, a base station, such as the base station 104, transmits system information to a UE, such as the UE 102. The system information includes, but not limited to, SIB2 and SIBS messages. The SIB2 message can include an idleModeMeasurements parameter that indicates to the UE whether to perform cell measurements in the RRC idle mode. The SIBS can include a list of cells, such as the set of the secondary cells discussed in FIG. 1.

At 304, the base station transmits an RRC release message to the UE. The UE enters the RRC idle mode in response to receiving the RRC release message. In some aspects, the RRC release message can also include the list of cells and/or information of one or more timers, such as a T331 timer.

At 306, the UE performs idle mode measurement as discussed in FIG. 1. The UE can tune to a frequency of a cell to measure the cell. For example, the UE can measure a received signal strength of the cell when tuned to the frequency. In some aspects, the UE measures cells included in the list of cells received via the SIBS message, the RRC release message, and/or other messages from the base station. The UE can prioritize cells in the list of cells based on their characteristics.

In some aspects, the UE can categorize the list of cells into five subsets. A first subset includes cells that correspond to frequencies that are previously configured as secondary component carriers (SCCs) of the UE. In other words, the cells of the first subset served as secondary cells of the UE previously. A second subset includes cells that the UE was previously handed over to. The cells of the second subset served as primary cells of the UE previously. A third subset includes cells indicated in an SIB24 message received from the base station. For example, in an E-UTRA new radio-dual connection (EN-DC) scenario, the UE currently camps on an LTE cell and the SIB24 message may indicate NR cells that can serve the UE as secondary cells. A fourth subset includes cells corresponding to requested frequency bands included in a UE capability enquiry message received from the base station. A fifth subset includes everything else in the list of cells.

In some aspects, the UE starts the T331 timer when entering the RRC idle mode. The UE measures one or more cells in the list of cells before the T331 timer expires. The duration of the T331 timer is indicated in the RRC release message. After the T331 timer expires, the UE then starts a first priority timer and measures one or more cells included in the first, the second, the third, and the fourth subsets before the first priority timer expires. After the first priority timer expires, the UE starts a second priority timer and measures one or more cells included in the first, the second, and the third subsets before the second priority timer expires. After the second priority timer expires, the UE starts a third priority timer and measures one or more cells included in the first and the second subsets before the third priority timer expires. Finally, the UE continues to measure cells in the first subset after the third priority timer expires. In some aspects, durations of the first, the second, and the third priority timers can be configured by the base station. For example, the base station can configure the UE via an RRC signaling. The UE can also determine the durations of the first, the second, and the third priority timers without being configured by the base station.

In some aspects, the list of cells received by the UE can be incomplete. For example, the UE may not receive the SIB24 message from the base station and thus the list does not include the cells of the third subset. In such a case, the UE prioritizes the cells in the incomplete list in a similar way as described above. For example, the UE measures one or more cells included in the first and the second subsets after the expiration of the first timer and before the expiration of the second timer because the third subset is empty.

In some aspects, the base station can be configured to not provide information regarding the list of cells to the UE. For example, the SIBS message and the RRC release message do not include information on the list of cells. In such a case, the UE can determine the first subset and the second subset without instructions from the base station. For example, the UE can store a list of previous secondary cells in memory of the UE, such as the memory 250. The UE can also store a list of previous primary cells in the memory of the UE. Because the third, the fourth, and the fifth subsets are empty, the UE measures one or more cells in the first and the second subsets prior to the expiration of the third priority timer.

In some aspects, the UE can perform cell reselection during the RRC idle mode. For example, the UE 102 can move closer to the base station 108 and away from the base station 104. The UE 102 may determine that the received signal strength of the cell 112 is stronger than that of the cell 110 and camp on the cell 112 instead of the cell 110. In such a case, the list of cells needs to be updated because the cells in the list can be far away from a current location of the UE 102. In some aspects, the UE 102 may have camped on the cell 112 before and stored a second list of cells that corresponds to the cell 112 in the memory of the UE 102. The UE 102 can retrieve the second list of cells from the memory of the UE 102 and measure cells in the second list. The second list of cells can also include five subsets as described above and the UE 102 can prioritize the cells in the second list similarly. In some aspects, the UE 102 can determine a third list of cells based on system information received from the base station 108 in the cell 112. For example, the base station 108 can broadcast an SIBS message and an SIB24 message, which include cells of the third list.

In some aspects, the UE 102 measures one or more cells in the second list or the third list prior to the T331 timer expiration. On the other hand, the UE 102 measures one or more cells in the second list after the T331 timer expiration.

In some aspects, the UE 102 may determine that a cell in a list, such as the second list and the third list, is unidentifiable after a predetermined number of attempts. For example, the UE 102 tunes to a frequency of the cell and attempts to measure received signal strengths in a first and a second wake-up periods. However, the received signal strengths may be below a minimum strength threshold. In such a case, the UE 102 removes the unidentifiable cell from the list and stops measuring the cell.

At 308, the UE establishes an RRC connection with the base station. In some aspects, the bases station initiates the RRC connection by transmitting a paging message to the UE. In other aspects, the UE initiates the RRC connection when a wake-up trigger is detected, such as turning on a screen of the UE or launching an application in the UE. In both cases, the UE sends a physical random access channel (PRACH) preamble to the base station to request random access in the PRACH. The base station then transmits a random access response to the UE granting the random access. Following that, the UE transmits an RRC connection request to the base station in the PRACH and the base station transmits an RRC connection setup message in a signaling radio bearer (SRB). The RRC connection setup message includes information for the UE to establish the RRC connection. Finally, the UE transmits an RRC connection setup complete message to the base station indicating the RRC connection setup is completed based on the RRC connection setup message.

At 310, the base station transmits a UE information request to the UE. In some aspects, the UE information request indicates a list of cells that the UE is to measure. In other aspects, the UE information request indicates the UE to return available measurement information that the UE already has.

At 312, the UE transmits a UE information response to the base station. In some aspects, the UE information response includes measurement information regarding the list of cells included in the UE information request. In other aspects, the UE information response includes measurement information that the UE already has.

In some aspects, for the measurement of each cell, the UE checks a period that has passed after the cell is measured. The UE may determine that the period is smaller than a staleness threshold and report the measurement of the cell to the base station in the UE information response. Otherwise, the UE may withhold the measurement of the cell in reporting. In some aspects, the staleness threshold corresponds to a moving speed of the UE. For example, the UE may set the staleness threshold to 2 seconds if the UE moves at a speed consistent with a vehicle. The UE may set the staleness threshold to 10 seconds if the UE moves at a walking speed. The UE may set the staleness threshold to 20 seconds if the UE is stationary. In this way, the UE can filter the cell measurements that may be unreliable based on movements of the UE.

At 314, the UE and the base station perform an RRC connection reconfiguration. In some aspects, the base station may determine that one or more secondary cells that served the UE previously have weak signal strengths and remove them from serving cells of the UE. For example, the base station may determine that the received signal strengths of the one or more cells reported by the UE in 312 are below a threshold. In such a case, the base station can inform the UE that the one or more secondary cells no longer serve the UE and the UE then refrain from transmitting to and receiving from the one or more secondary cells.

In some aspects, the base station may determine that a cell reported by the UE in 312 has a stronger signal strength than a primary cell of the UE. The base station can initiate a process to hand over the UE to that cell.

Figure 4:
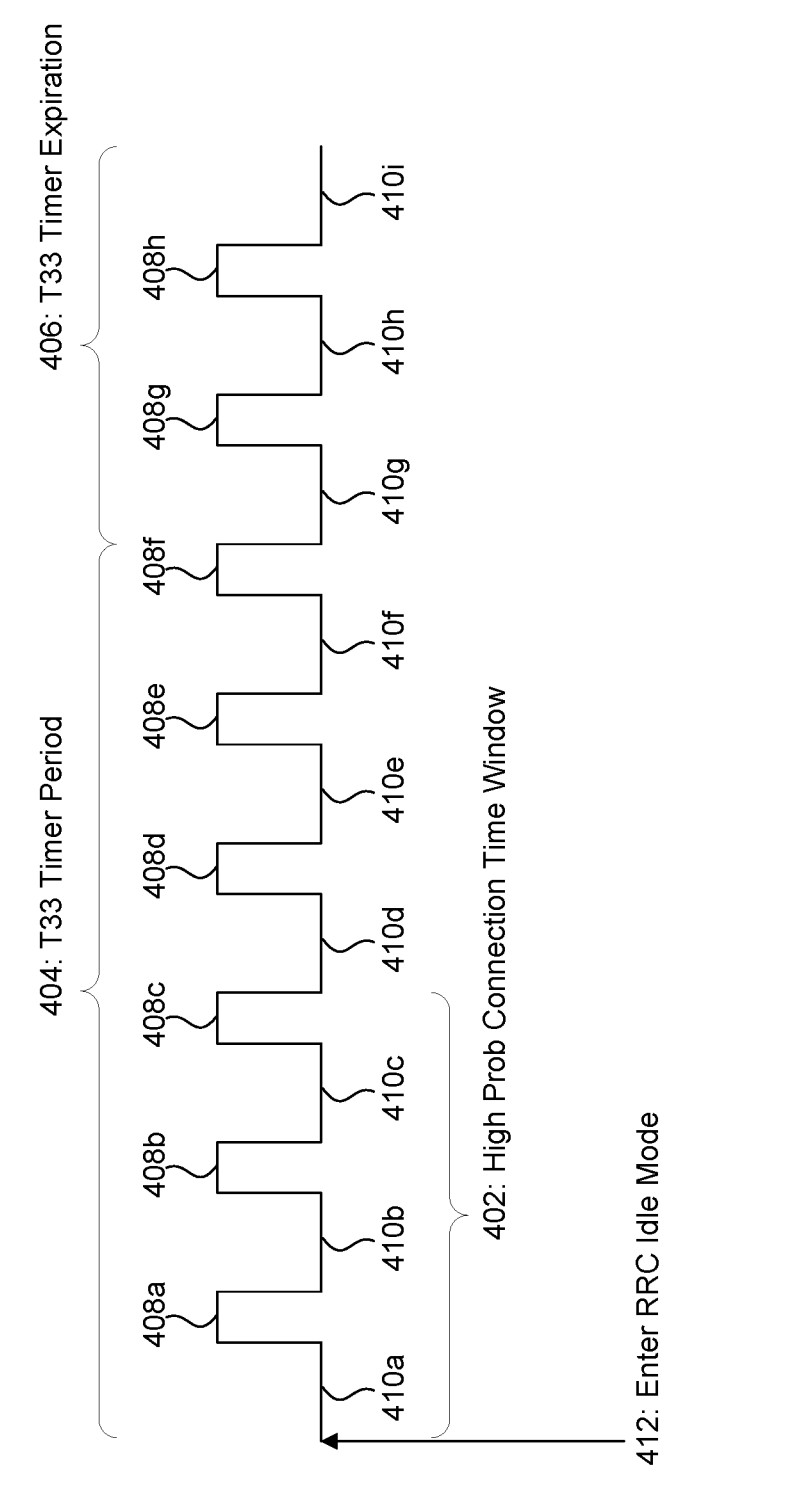
FIG. 4 illustrates an example of enhanced cell measurements within a high probability connection window, according to aspects of the disclosure.

FIG. 4 illustrates an example 400 of enhanced cell measurements within a high probability connection window. The example 400 is provided for the purpose of illustration only and does not limit the disclosed aspects. As a convenience and not a limitation, FIG. 4 may be described with regard to elements of FIGS. 1, 2, and 7. The example 400 may represent the operation of electronic devices (for example, the UE 102, and the base stations 104 and 108 of FIG. 1) implementing the cell measurements and reporting. The example 400 can be performed in 306 of FIG. 3. The example 400 can also be performed by the electronic device 200 of FIG. 2, controlled or implemented by processor 210, and/or computer system 700 of FIG. 7. But the example 400 is not limited to the specific aspects depicted in those figures and other systems may be used to perform the method, as will be understood by those skilled in the art. It is to be appreciated that not all operations may be needed, and the operations may not be performed in the same order as shown in FIG. 4.

In some aspects, the example 400 illustrates activities of a UE, such as the UE 102, in the RRC idle mode. The UE enters the RRC idle mode at a time point 412. In the RRC idle mode, the UE wakes up periodically. For example, the UE can wake up during wake-up periods 408*a*, 408*b*, 408*c*, 408*d*, 408*e*, 408*f*, 408*g*, and 408*h*. The UE stays in a power saving mode in sleep periods 410*a*, 410*b*, 410*c*, 410*d*, 410*e*, 410*f*, 410*g*, 410*h*, and 410*i*. During the wake-up periods, the UE monitors radio signals from a base station, such as the base station 104, to receive paging messages and/or system information. The UE can also measure cells, such as secondary cells, in the wake-up periods. In some aspects, the UE determines a list of cells to be measured in the RRC idle mode as described in 306 of FIG. 3. For example, the list may have eight cells and the UE can measure two cells in each wake-up period. In such a case, the UE can complete one round of measurements in the wake-up periods 408*a*, 408*b*, 408*c*, and 408*d*.

In some aspects, the UE starts a timer when entering the RRC idle mode. For example, the UE starts a T331 timer at the time point 412. The T331 timer has a period 404 and expires at the end of the wake-up period 408*f*. In some aspects, the UE can refrain from measuring cells after the timer T331 expires. A period 406 represents a period after the T331 expiration. For example, the UE refrains from measuring cells in the wake-up periods 408g and 408h, which are within the period 406.

In some aspects, the UE may receive a paging message from the base station in any of the wake-up period. For example, UE may receive the paging message in the wake-up period 408c and subsequently return to the RRC connected mode. As the result, the UE measures cells in the wake-up periods 408a and 408b and may not complete the one round of measurements when returning to the RRC connected mode. Thus, the UE may be required to perform cell measurements before performing the RRC connection reconfiguration as described in 314 of FIG. 3, which causes a delay in resuming communications between the UE and the base station.

In some aspects, the UE can also start a high probability connection timer with a period 402 when entering the RRC idle mode at the time point 412. The period 402 can also be referred to as a high probability connection time window. The UE can have a high probability of returning to the RRC connected mode before the high probability connection timer expires. For example, the UE can have an 80% chance to return to the RRC connected mode within the period 402. In another example, the UE may on average stay in the RRC idle mode for the period 402. In some aspects, the period 402 can be smaller than the period 404 and can be 60 seconds for example. The UE can wake up and perform cell measurements in the sleep periods within the period 402. Specifically, the UE can perform cell measurements in the sleep periods 410a, 410b, and 410c. In one example, the UE can measure two cells in each sleep period and can complete one round of measurements of eight cells at the end of the wake-up period 408b. In such a case, when the UE returns to the RRC connected mode after the wake-up period 408c, the UE can report results of the cell measurements to the base station without performing additional measurements. In some aspects, the sleep periods 410 are longer than the wake-up periods 408. In such a case, the UE can measure more cells in the sleep periods than in the wake-up periods. For example, the UE may be able to perform one round of the measurements to measure eight cells in one sleep period.

It is worth noting that the periods 402, 404, and 406, the wake-up periods 408, and the sleep periods 410 shown in FIG. 4 are examples and not limiting. The period 406 can be longer than the period 404. The wake-up periods 408 can have a same length or different lengths. Similarly, the sleep periods 410 can have a same length or different lengths. The periods 402, 404, and 406 can also include different numbers of sleep periods and wake-up periods from the example 400.

Figure 5:
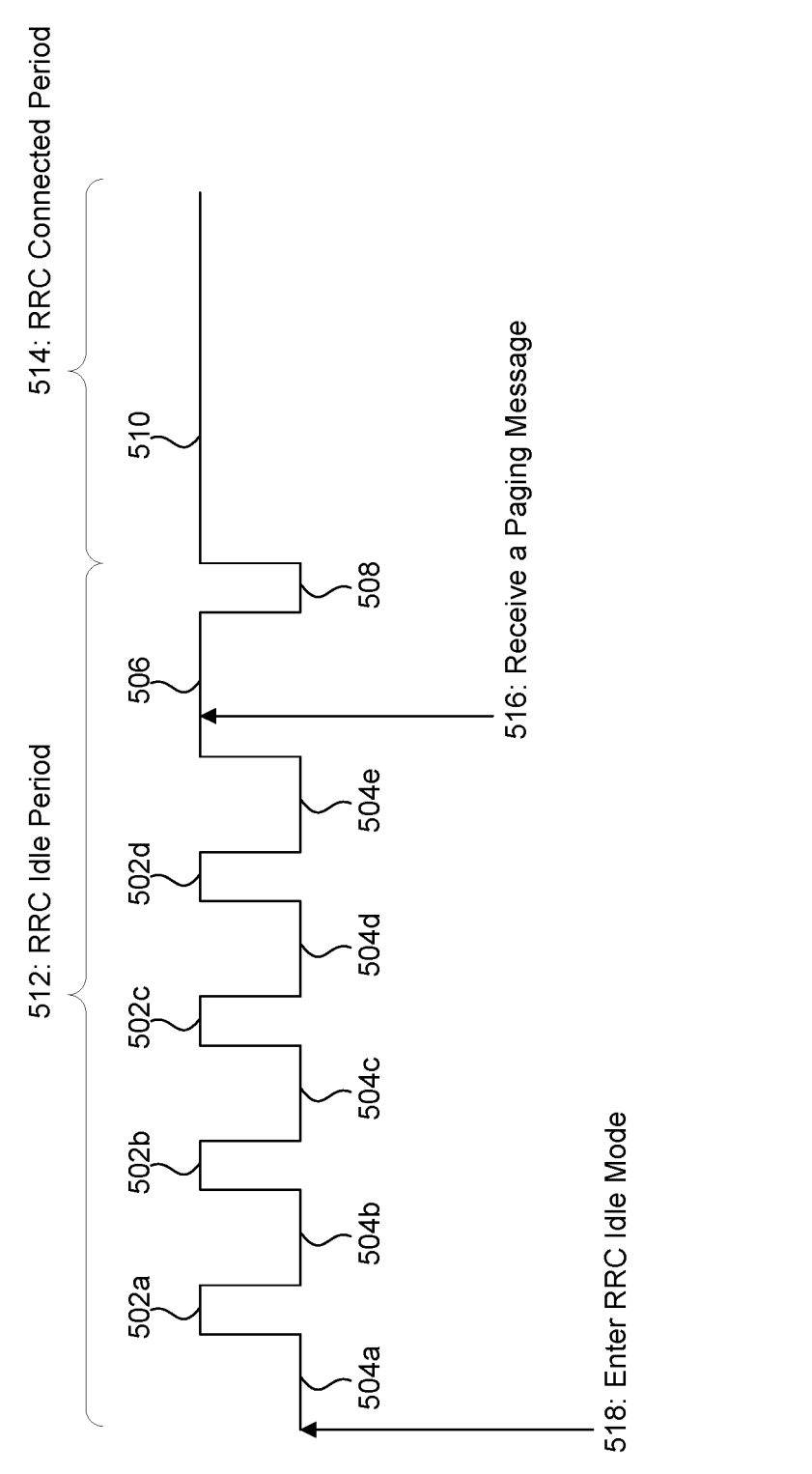
FIG. 5 illustrates an example of enhanced cell measurements in response to a paging message, according to aspects of the disclosure.

FIG. 5 illustrates an example 500 of enhanced cell measurements in response to a paging message. The example 500 is provided for the purpose of illustration only and does not limit the disclosed aspects. As a convenience and not a limitation, FIG. 5 may be described with regard to elements of FIGS. 1, 2, and 7. The example 500 may represent the operation of electronic devices (for example, the UE 102, and the base stations 104 and 108 of FIG. 1) implementing the cell measurements and reporting. The example 500 can be performed in 306 of FIG. 3. The example 500 can also be performed by the electronic device 200 of FIG. 2, controlled or implemented by processor 210, and/or computer system 700 of FIG. 7. But the example 500 is not limited to the specific aspects depicted in those figures and other systems may be used to perform the method, as will be understood by those skilled in the art. It is to be appreciated that not all operations may be needed, and the operations may not be performed in the same order as shown in FIG. 5.

In some aspects, the UE starts a T331 timer when entering the RRC idle mode and the T331 timer expires at a time point 518. The UE wakes up in wake-up periods 502a, 502b, 502c, 502d, and 506. The UE stays in the power saving mode in sleep periods 504a, 504b, 504c, 504d, 504e, and 508. The UE can stop measuring cells after the time point 518, e.g., in the wake-up periods 502a, 502b, 502c, and 502d, to save power because the T331 timer has expired. The UE can receive a paging message from the base station at a time point 516 and return to the RRC connected mode in a period 510. Specifically, the UE can establish the RRC connection in the period 510 as described in 308 of FIG. 3. In other words, the UE is in the RRC idle mode in a period 512 and in the RRC connected mode in the period 514. However, in such a case, the UE may need to measure cells after returning to the RRC connected mode, which causes a delay in resuming communications between the UE and the base station. To avoid this situation, the UE can perform cell measurement after receiving the paging message at the time point 516. Specifically, the UE can measure the cells in the wake-up period 506 after the time point 516. To complete one round of measurements, such as measuring eight cells, the UE can extend the wake-up period 506 after receiving the paging message so that the UE has enough time to perform the one round of measurements. Therefore, the wake-up period 506 can be longer than other wake-up periods, such as the wake-up periods 502a, 502b, 502c, and 502d. The sleep period 508 can be shorter than other sleep periods, such as the sleep periods 504a, 504b, 504c, 504d, and 504e, because the UE expects to return to the RRC connected mode.

Figure 6:
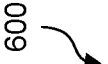
FIG. 6 illustrates an example enhance cell measurements in response to a wake-up trigger, according to aspects of the disclosure.
Figure 6:
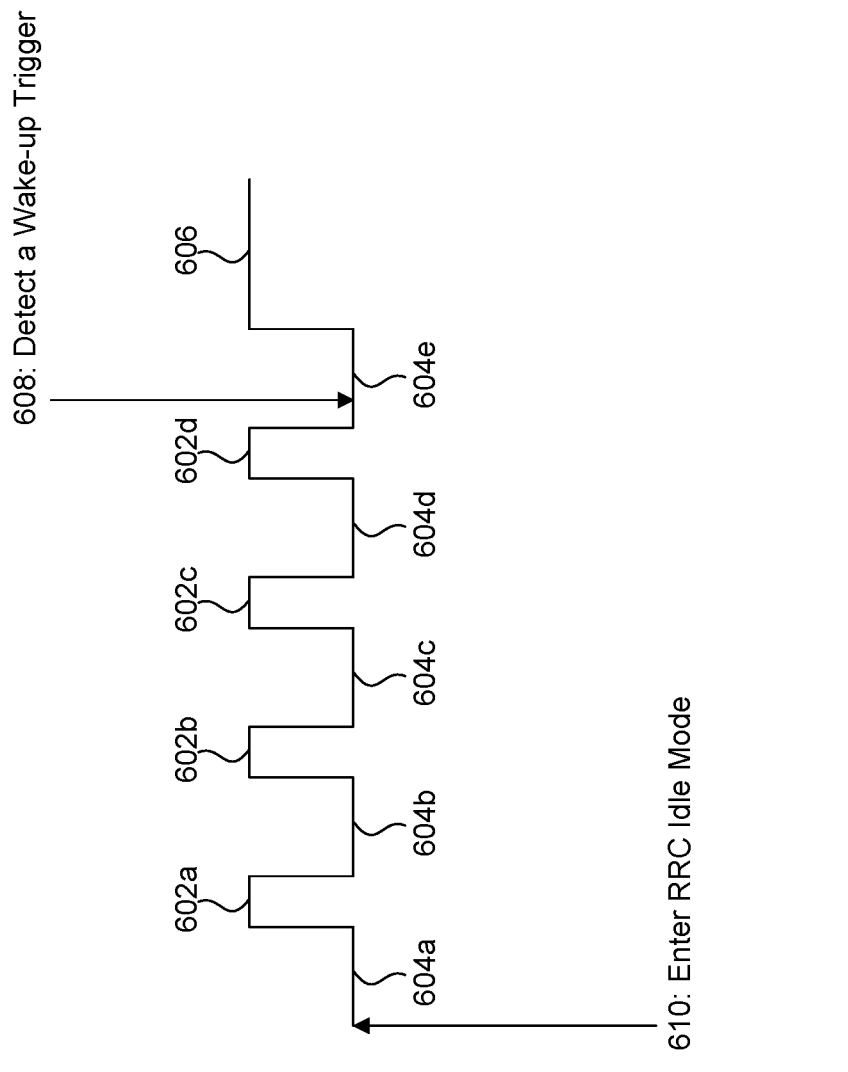

FIG. 6 illustrates an example 600 of enhanced cell measurements in response to a wake-up trigger. The example 600 is provided for the purpose of illustration only and does not limit the disclosed aspects. As a convenience and not a limitation, FIG. 6 may be described with regard to elements of FIGS. 1, 2, and 7. The example 600 may represent the operation of electronic devices (for example, the UE 102, and the base stations 104 and 108 of FIG. 1) implementing the cell measurements and reporting. The example 600 can be performed in 306 of FIG. 3. The example 600 can also be performed by the electronic device 200 of FIG. 2, controlled or implemented by processor 210, and/or computer system 700 of FIG. 7. But the example 600 is not limited to the specific aspects depicted in those figures and other systems may be used to perform the method, as will be understood by those skilled in the art. It is to be appreciated that not all operations may be needed, and the operations may not be performed in the same order as shown in FIG. 6.

In some aspects, the UE enters the RRC idle mode at a time point 610. The UE wakes up in wake-up periods 602a, 602b, 602c, 602d, and 606. The UE stays in the power saving mode in sleep periods 604a, 604b, 604c, 604d, and 604e. Normally, the UE refrains from measuring cells in the sleep periods. However, the UE can perform enhanced measurements in response to a wake-up trigger. For example, the UE can detect the wake-up trigger at a time point 608. The wake-up trigger indicates activities of the UE that require the UE to return to the RRC connected mode within a short period. For example, the wake-up trigger can include, but not limited to, waking up an application processor (AP) of the UE, tuning on a screen of the UE, unlocking the screen, launching an application of the UE that requires internet connectivity, or indicating that a background task is allowed to use network resources. The UE can wake up and perform one round of measurements in response to the wake-up trigger in the sleep period 604e. The UE can also continue to measure cells after the sleep period 604e ends and the wake-up period 606 starts if the one round of measurements is not completed.

In some aspects, the UE can perform the one round of measurements regardless of whether a T331 timer expires. For example, the T331 timer may still be running at the time point 608 and the UE can perform the one round of measurements to obtain recent conditions of the cells. In another example, the T331 timer may be expired after the wake-up period 602b and the UE refrains from measuring cells in the wake-up periods 602c and 602d. In such a case, the UE does not complete the measurements of eight cells when detecting the wake-up trigger at the time point 608. The UE performs the one round of measurements in the sleep period 604e to avoid performing measurements after returning to the RRC connected mode.

In some aspects, the UE can perform the one round of measurements regardless of whether the UE detects the wake-up trigger in a sleep period. For example, the UE can detect the wake-up trigger in the wake-up period 602c. The UE can immediately start the one round of measurements and abandon other ongoing measurements. The UE can also extend the wake-up period 602c to complete the one round of measurements.

Computer system 700 may also include one or more secondary storage devices or memory 710. Secondary memory 710 may include, for example, a hard disk drive 712 and/or a removable storage device or drive 714. Removable storage drive 714 may be a floppy disk drive, a magnetic tape drive, a compact disk drive, an optical storage device, tape backup device, and/or any other storage device/drive.

Removable storage drive 714 may interact with a removable storage unit 718. Removable storage unit 718 includes a computer usable or readable storage device having stored thereon computer software (control logic) and/or data. Removable storage unit 718 may be a floppy disk, magnetic tape, compact disk, DVD, optical storage disk, and/any other computer data storage device. Removable storage drive 714 reads from and/or writes to removable storage unit 718 in a well-known manner.

According to some aspects, secondary memory 710 may include other means, instrumentalities or other approaches for allowing computer programs and/or other instructions and/or data to be accessed by computer system 700. Such means, instrumentalities or other approaches may include, for example, a removable storage unit 722 and an interface 720. Examples of the removable storage unit 722 and the interface 720 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 700 may further include a communication or network interface 724. Communication interface 724 enables computer system 700 to communicate and interact with any combination of remote devices, remote networks, remote entities, etc. (individually and collectively referenced by reference number 728). For example, communication interface 724 may allow computer system 700 to communicate with remote devices 728 over communications path 726, which may be wired and/or wireless, and which may include any combination of LANs, WANs, the Internet, etc. Control logic and/or data may be transmitted to and from computer system 700 via communication path 726.

The operations in the preceding aspects may be implemented in a wide variety of configurations and architectures.

Therefore, some or all of the operations in the preceding aspects may be performed in hardware, in software or both. In some aspects, a tangible, non-transitory apparatus or article of manufacture includes a tangible, non-transitory computer useable or readable medium having control logic (software) stored thereon is also referred to herein as a computer program product or program storage device. This includes, but is not limited to, computer system 700, main memory 708, secondary memory 710 and removable storage units 718 and 722, as well as tangible articles of manufacture embodying any combination of the foregoing. Such control logic, when executed by one or more data processing devices (such as computer system 700), causes such data processing devices to operate as described herein.

Figure 7:
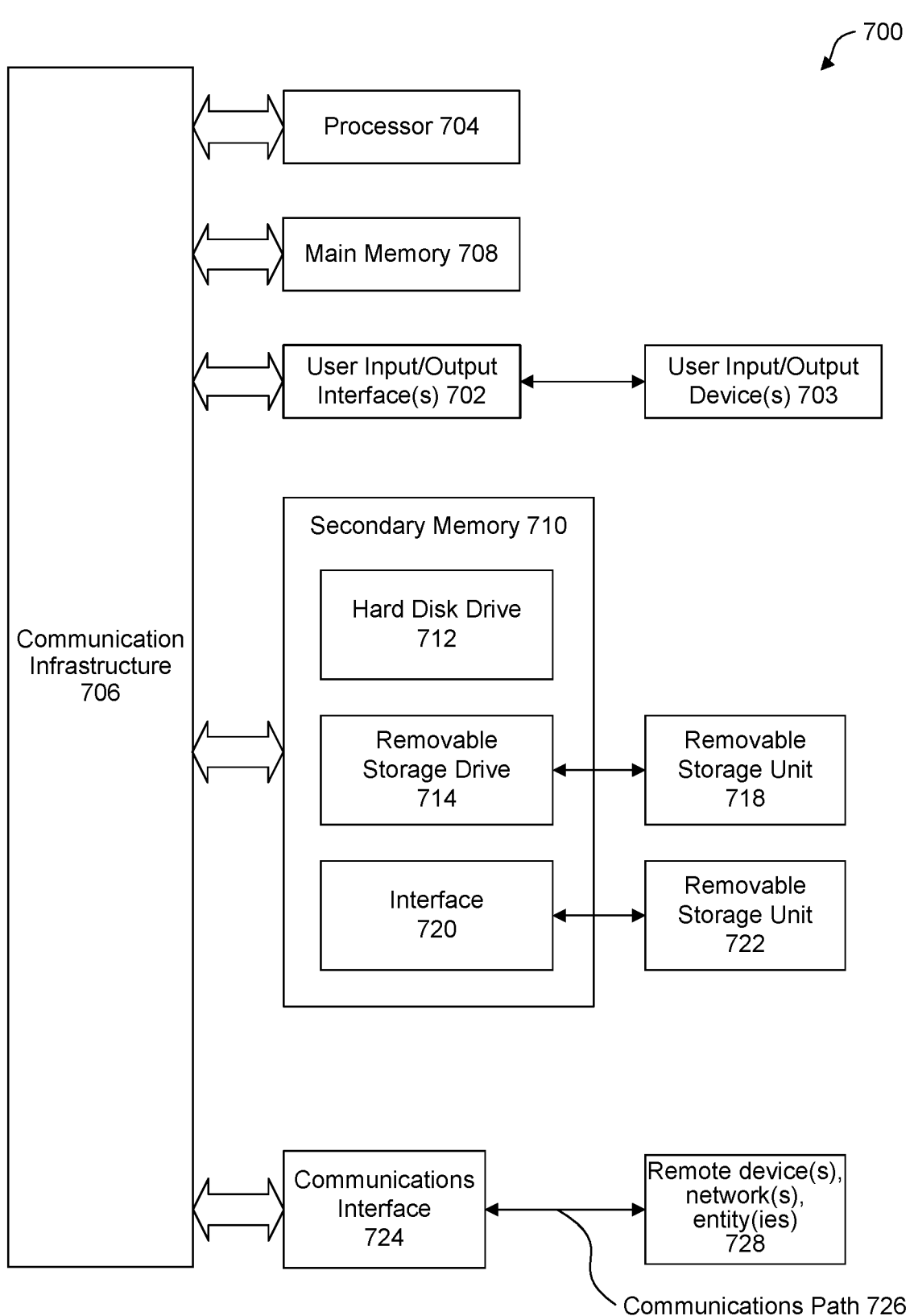
FIG. 7 is an example computer system for implementing some aspects of the disclosure or portion(s) thereof.

Based on the teachings contained in this disclosure, it will be apparent to persons skilled in the relevant art(s) how to make and use aspects of the disclosure using data processing devices, computer systems and/or computer architectures other than that shown in FIG. 7. In particular, aspects may operate with software, hardware, and/or operating system implementations other than those described herein.

It is to be appreciated that the Detailed Description section, and not the Summary and Abstract sections, is intended to be used to interpret the claims. The Summary and Abstract sections may set forth one or more, but not all, exemplary aspects of the disclosure as contemplated by the inventor(s), and thus, are not intended to limit the disclosure or the appended claims in any way.

While the disclosure has been described herein with reference to exemplary aspects for exemplary fields and applications, it should be understood that the disclosure is not limited thereto. Other aspects and modifications thereto are possible, and are within the scope and spirit of the disclosure. For example, and without limiting the generality of this paragraph, aspects are not limited to the software, hardware, firmware, and/or entities illustrated in the figures and/or described herein. Further, aspects (whether or not explicitly described herein) have significant utility to fields and applications beyond the examples described herein.

Aspects have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. In addition, alternative aspects may perform functional blocks, steps, operations, methods, etc. using orderings different from those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other aspects whether or not explicitly mentioned or described herein.

The breadth and scope of the disclosure should not be limited by any of the above-described exemplary aspects, but should be defined only in accordance with the following claims and their equivalents.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should only occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of, or access to, certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

What is claimed is:

1. A user equipment (UE) comprising:
a transceiver configured to enable wireless communications with a base station; and
a processor, communicatively coupled to the transceiver, and configured to:
enter a radio resource control (RRC) idle mode;
measure at least one cell of a set of cells in a sleep period, wherein the sleep period is indicated in a discontinuous reception (DRX) configuration message received from the base station;
receive a UE information request from the base station responsive to entering an RRC connected mode;
transmit results of the measurement to the base station responsive to the UE information request;
receive an RRC release message from the base station, wherein the RRC idle mode is entered based on the RRC release message; and
receive a system information block 2 (SIB2) message that includes an idle mode measurement indicator, wherein measuring the at least one cell of the set of cells in the sleep period is based on the idle mode measurement indicator.

2. The UE of claim 1, wherein the processor is further configured to:

start a timer in response to entering the RRC idle mode, wherein a duration of the timer corresponds to an average period that the UE remains in the RRC idle mode;
wherein measuring the at least one cell of the set of cells in the sleep period is based on:
determining that the timer is not expired.

3. The UE of claim 1, wherein the processor is further configured to:
determine that a T331 timer is expired;
receive a paging message from the base station; and
measure the set of cells responsive to the paging message.

4. The UE of claim 1, wherein the processor is further configured to:
detect a wake-up trigger; and
measure the set of cells based on the wake-up trigger.

5. The UE of claim 4, wherein the wake-up trigger includes:
waking up an application processor (AP) of the UE;
turning on a screen of the UE;
unlocking the screen;
launching an application of the UE that requires internet connectivity; or
indicating that a background task is allowed to use network resources.

6. The UE of claim 1, wherein the processor is further configured to:
receive a list of the set of cells from the base station, wherein the set of cells includes:
a first subset of cells that corresponds to frequencies that are previously configured as secondary component carriers (SCCs),
a second subset of cells that the UE previously performed a hand over to,
a third subset of cells indicated in an SIB24 message received from the base station, and
a fourth subset of cells that corresponds to requested frequency bands included in a UE capability enquiry message received from the base station;
start a first priority timer in response to a T331 timer expiration;
measure one or more cells of the set of cells prior to the first priority timer expiration;
start a second priority timer in response to the first priority timer expiration;
measure one or more cells of the first, the second, and the third subsets of cells prior to the second priority timer expiration;
start a third priority timer in response to the second priority timer expiration;
measure one or more cells of the first and the second subsets of cells prior to the third priority timer expiration; and
measure one or more cells of the first subset of cells after the third priority timer expiration.

7. The UE of claim 1, wherein the processor is further configured to:
retrieve a list of the set of cells from a memory of the UE, wherein the set of cells includes:
a first subset of cells that corresponds to frequencies that are previously configured as secondary component carriers (SCCs), and
a second subset of cells that the UE is previously configured to hand over to;
start a first priority timer in response to a T331 timer expiration;

measure one or more cells of the set of cells prior to the first priority timer expiration; and measure one or more cells of the first subset of cells after the first priority timer expiration.

8. The UE of claim 1, wherein the processor is further configured to:

determine a current camping cell;

camp on a second camping cell that is different from the current camping cell;

determine a second set of cells corresponding to the second camping cell by:

retrieving a list of cells measured by the UE when previously camped on the second camping cell; or determining a list of cells based on system information received; and measure at least one cell of the second set of cells in the sleep period.

9. The UE of claim 1, wherein to transmit the results of the measurement to the base station, the processor is further configured to:

determine a staleness duration based on a current time and a time of measuring the at least one cell of the set of cells; and determine that the staleness duration is smaller than a predetermined staleness threshold, wherein the staleness threshold is based on a moving speed of the UE.

10. A method of operating a user equipment (UE) comprising:

entering a radio resource control (RRC) idle mode;

measuring at least one cell of a set of cells in a sleep period, wherein the sleep period is indicated in a discontinuous reception (DRX) configuration message received from the base station;

receiving a UE information request from the base station responsive to entering an RRC connected mode;

transmitting results of the measurement to the base station responsive to the UE information request;

receiving an RRC release message from the base station, wherein the RRC idle mode is entered based on the RRC release message; and receiving a system information block 2 (SIB2) message that includes an idle mode measurement indicator;

wherein measuring the at least one cell of the set of cells in the sleep period is based on the idle mode measurement indicator.

11. The method of claim 10, further comprising:

starting a timer in response to entering the RRC idle mode, wherein a duration of the timer corresponds to an average period that the UE remains in the RRC idle mode;

wherein measuring the at least one cell of the set of cells in the sleep period is based on:

determining that the timer is not expired.

12. The method of claim 10, further comprising:

determining that a T331 timer is expired;

receiving a paging message from the base station; and measuring the set of cells responsive to the paging message.

13. The method of claim 10, further comprising:

detecting a wake-up trigger; and measuring the set of cells based on the wake-up trigger.

14. The method of claim 10, wherein the wake-up trigger includes:

waking up an application processor (AP) of the UE;

tuning on a screen of the UE;

unlocking the screen;

launching an application of the UE that requires internet connectivity; or indicating that a background task is allowed to use network resources.

15. The method of claim 10, further comprising:

receiving a list of the set of cells from the base station, wherein the set of cells includes:

a first subset of cells that corresponds to frequencies that are previously configured as secondary component carriers (SCCs), a second subset of cells that the UE previously performed a hand over to, a third subset of cells indicated in an SIB24 message received from the base station, and a fourth subset of cells that corresponds to requested frequency bands included in a UE capability enquiry message received from the base station;

starting a first priority timer in response to a T331 timer expiration;

measuring one or more cells of the set of cells prior to the first priority timer expiration;

starting a second priority timer in response to the first priority timer expiration;

measuring one or more cells of the first, the second, and the third subsets of cells prior to the second priority timer expiration;

starting a third priority timer in response to the second priority timer expiration;

measuring one or more cells of the first and the second subsets of cells prior to the third priority timer expiration; and measuring one or more cells of the first subset of cells after the third priority timer expiration.

16. The method of claim 10, wherein transmitting the results of the measurement to the base station further comprises:

determining a staleness duration based on a current time and a time of measuring the at least one cell of the set of cells; and determining that the staleness duration is smaller than a predetermined staleness threshold, wherein the staleness threshold is based on a moving speed of the UE.

17. A non-transitory computer-readable medium (CRM) comprising instructions to, upon execution of the instructions by one or more processors of a user equipment (UE), cause the UE to perform operations, the operations comprising:

entering a radio resource control (RRC) idle mode;

measuring at least one cell of a set of cells in a sleep period, wherein the sleep period is indicated in a discontinuous reception (DRX) configuration message received from the base station;

receiving a UE information request from the base station responsive to entering an RRC connected mode; and transmitting results of the measurement to the base station responsive to the UE information request;

receiving an RRC release message from the base station, wherein the RRC idle mode is entered based on the RRC release message; and receiving a system information block 2 (SIB2) message that includes an idle mode measurement indicator;

wherein measuring the at least one cell of the set of cells in the sleep period is based on the idle mode measurement indicator.

18. The non-transitory CRM of claim 17, the operations further comprising:

starting a timer in response to entering the RRC idle mode, wherein a duration of the timer corresponds to an average period that the UE remains in the RRC idle mode;

wherein measuring the at least one cell of the set of cells in the sleep period is based on:

determining that the timer is not expired.

19. The non-transitory CRM of claim 17, the operations further comprising:

receiving a paging message from the base station; and measuring the set of cells responsive to the paging message.

\* \* \* \* \*